No. 722,697. PATENTED MAR. 17, 1903.
C. R. GREUTER.
FRICTION CLUTCH.
APPLICATION FILED JUNE 30, 1902.
NO MODEL. 2 SHEETS—SHEET 1.
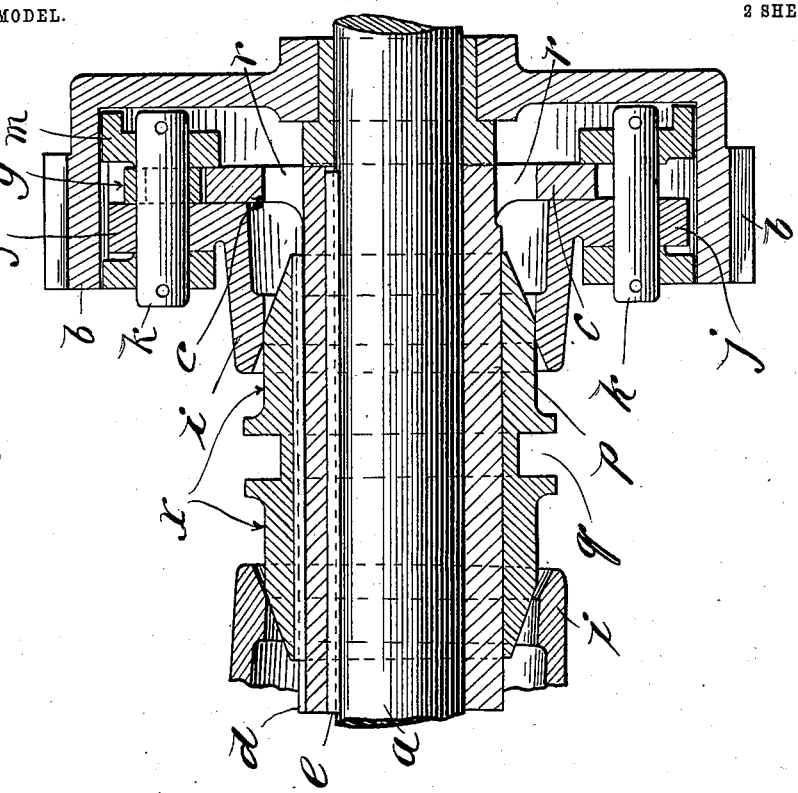
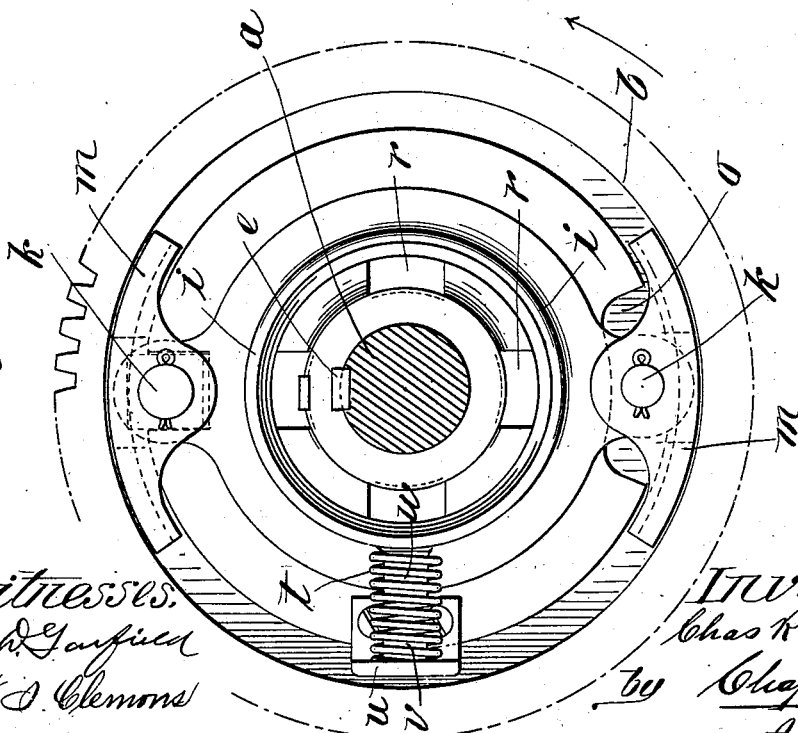

No. 722,697. PATENTED MAR. 17, 1903.
C. R. GREUTER.
FRICTION CLUTCH.
APPLICATION FILED JUNE 30, 1902.
NO MODEL. 2 SHEETS—SHEET 2.
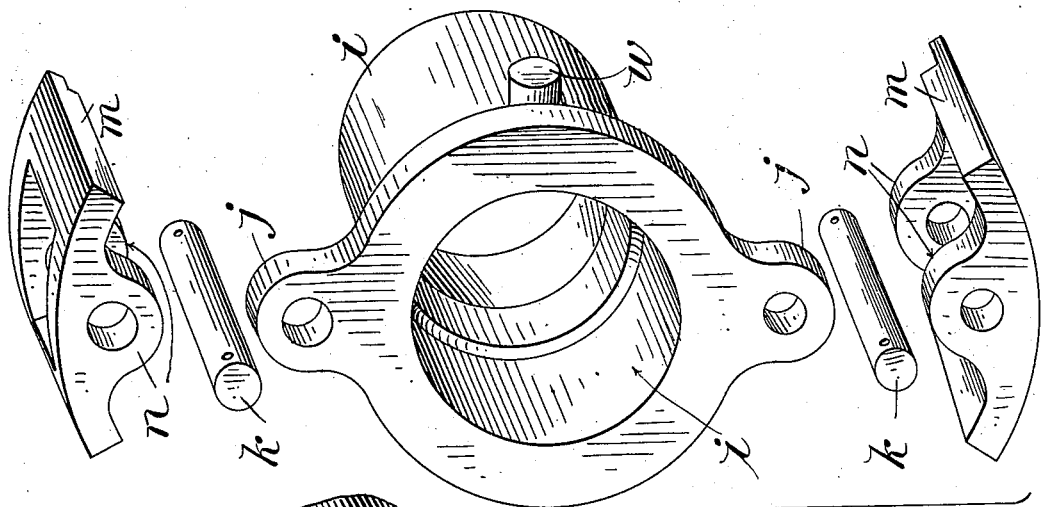
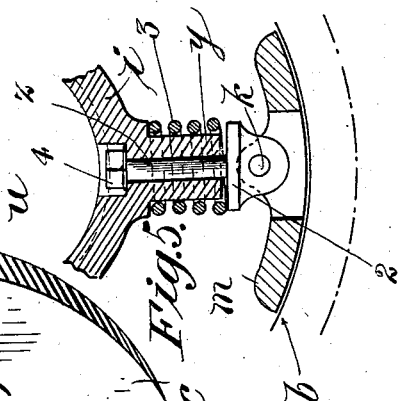
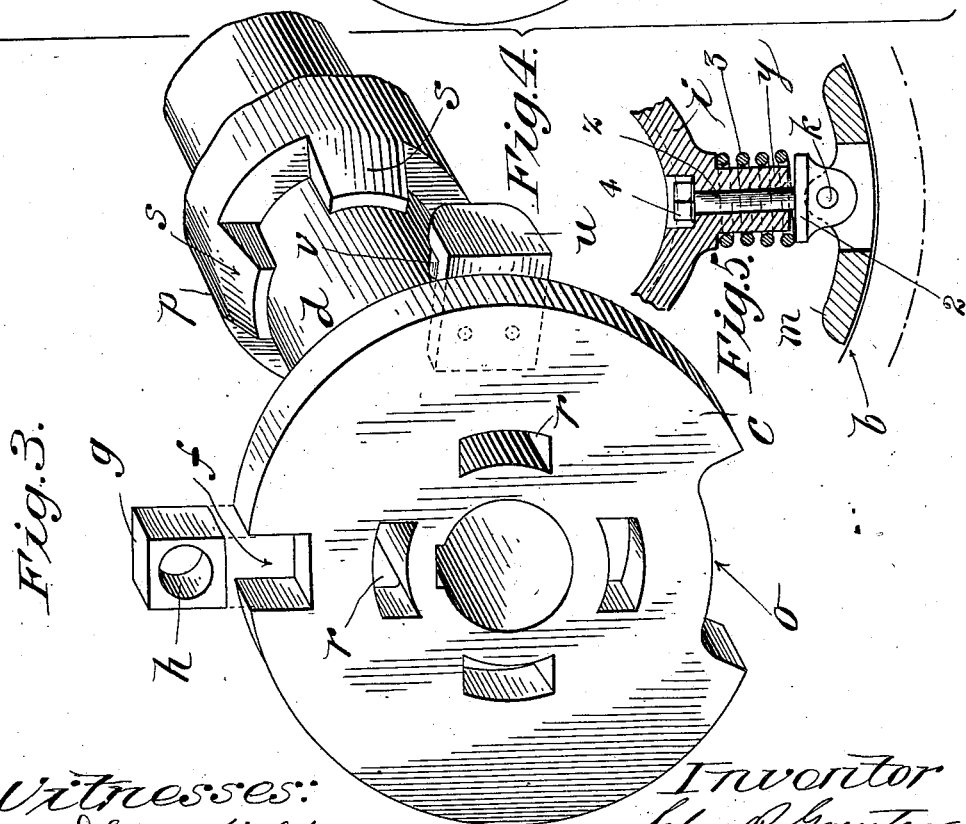

UNITED STATES PATENT OFFICE.

CHARLES R. GREUTER, OF HOLYOKE, MASSACHUSETTS.

FRICTION-CLUTCH.

SPECIFICATION forming part of Letters Patent No. 722,697, dated March 17, 1903.

Application filed June 30, 1902. Serial No. 113,863. (No model.)

*To all whom it may concern:*

Be it known that I, CHARLES R. GREUTER, a citizen of the United States of America, residing at Holyoke, in the county of Hampden and State of Massachusetts, have invented new and useful Improvements in Friction-Clutches, of which the following is a specification.

This invention relates to friction-clutches, the object of the invention being to improve the construction of this class of mechanism in respect of ease of engagement, the control of the degree of engagement, and the tenacity of engagement of the driving and driven members of the clutch.

The clutch embodying this invention is fully illustrated in the drawings forming part of this application, in which—

Figure 1 is an end elevation of the clutch, the shaft on which it is mounted being shown in section. Fig. 2 is a longitudinal sectional elevation of the same. Fig. 3 is a perspective view of the member secured to the driving-shaft. Fig. 4 is a perspective view of the shoe-carrying sleeve, the shoes being shown in separated relation to said sleeve. Fig. 5 is a sectional view of a portion of the driving member of the clutch, showing a modification in the means of connection between a shoe and said member.

Referring to the drawings, $a$ indicates a portion of a driving-shaft on which the clutch is mounted and from which power is to be transmitted from the driven member $b$ to some other shaft or machine. This driven member may be in the form of a gear, as shown herein, or a pulley having a flange thereon against which the driving members of the clutch may be forced, and is mounted upon the shaft $a$ to rotate freely thereon when not operatively engaged by the clutch mechanism, which rotates with said shaft. This mechanism consists of a circular plate $c$, having a long hub $d$ preferably integral therewith, which is secured to the shaft $a$ by a key $e$ or in any other suitable manner. In the periphery of the circular plate $c$ a radial slot $f$ is cut for the reception of the rectangular block $g$, having the central perforation $h$ therein, whose axis is parallel with the shaft $a$ when the block is in position in the slot.

A shoe-carrying sleeve $i$, which is shown in perspective view in Fig. 4, slides over the long hub $d$, and on a flange of this sleeve, which is located at right angles to the axis of the latter at one end thereof, are two oppositely-located lugs $j$. The flanged end of this sleeve fits closely against the circular plate $c$, and the lugs $j$ are perforated to receive a pin $k$, which serves as means for pivotally securing the shoe $m$ in oppositely-located positions on the sleeve $i$, the shoes being each provided with ears $n$ to receive these pins $k$, and the distance between the ears is such that when the shoes are in position these ears will embrace not only the lugs $j$, but also the edge of the circular plate $c$, the pins $k$ passing through the central perforation $h$ in the block $g$.

At that point on the plate $c$ opposite the radial slot $f$ the plate is cut away, as at $o$, Figs. 1 and 3, and the pin on which that shoe is supported does not engage the plate $c$, while the pin on which the upper shoe is supported is restrained in respect to circumferential movement by its engagement with the block $g$, which lies in the radial slot $f$. It is thus seen that the lower shoe and, in fact, the entire sleeve $i$ may be swung in the plane of the plate $c$ on that pin $k$ which passes through the block $g$. It is to be noted also that the block $g$ may have a radial movement in the slot $f$ and that when the sleeve $i$ is concentric with the shaft $a$ the lower side of the block $g$ will not bear upon the bottom of the slot $f$, and when the sleeve $i$ is in this concentric position neither of the shoes $m$ will be in contact with the under side of the flange of the driven member $b$. This is the normal position of the parts when the clutch devices are running free in respect to the driven member. To maintain the sleeve $i$ in this concentric position, a cone $p$ is loosely mounted on the long hub $d$ to slide freely thereon endwise of said hub, and it is provided with an annular groove $q$, whereby by means of a fork it may be slid in either direction. This cone is so mounted on the hub $d$ as to slide into the sleeve $i$, the end of which contiguous to the cone is beveled to permit the easy entrance of the latter. Beyond the beveled end of the cone the latter is cylindrical in cross-section, and inside of the beveled portion of the sleeve $i$ the latter is also cylindrical in cross-section, and the cone is adapted to slide into the sleeve far enough to permit the cylindrical portion of the sleeve to rest upon the cylindrical portion of the cone.

If desired, the plate $c$ may be perforated, as at $r$, and the cone $p$ cut away to form the projections $s$, adapted to slide into said perforations $r$, whereby a greater degree of sliding movement may be imparted to the cone. As long as the cone $p$ is in such engagement with the sleeve $i$ that the latter is held in concentric position relative to the shaft the shoes $m$ cannot engage the driven member, and the latter will be idle on the shaft. If, however, the cone $p$ be withdrawn from its engagement with the sleeve $i$ sufficiently to withdraw the cylindrical part of the cone from the cylindrical part of the sleeve, permitting the latter to be supported only on the beveled end of the cone, the sleeve as a whole will immediately assume a position eccentric to the shaft, for the reason that the spring $t$, located between the driven member and one side of the sleeve $i$, as shown in Fig. 1, will cause the sleeve to swing on its eccentric bearing in the block $g$, whereby the shoe on the lower side of the sleeve may be forced into contact with the driven member. This contact under the continued pressure of the spring will impart to the sleeve a radial movement, the block $g$ sliding in its recess $f$ outwardly, and both shoes will thus be held in frictional contact with the driven member.

The spring $t$ is supported between an abutment $u$ and the side of the sleeve $i$ by means of two bosses $v$ and $w$, located, respectively, on said abutment and on said sleeve, over which the ends of the spring fit. This spring $t$ is so adjusted that when the cone $p$ is moved into the end of the sleeve $i$ the spring will be compressed, and therefore when the cone is withdrawn the spring presses the sleeve $i$ into eccentric position to whatever degree the withdrawal of the cone will permit. It is therefore very easy to establish a very light contact between the shoes and the driven member or to withdraw the cone far enough to permit a full contact of said shoes, and in any case it is seen that the endwise movement of the cone may determine the degree of contact between the shoes $m$ and the driven member, and whatever that contact may be the cone may always be made to increase or diminish it with the greatest ease.

When it is desired to drive another shaft from the shaft $a$, for example, at two different speeds, the cone may be made double-ended, as shown in Fig. 2, and two clutch mechanisms be mounted on the same shaft and be operated by the same cone. In such a case the cylindrical portion $x$ of the cone and the position of the ends of the two sleeves $i$ should be such that the cone may be so located between the two sleeves as will permit the cylindrical portion of said sleeve to rest upon the cylindrical portion $x$ of said cones, and when thus arranged the cone may be moved, as desired, in either direction to throw either one or the other of the clutch mechanisms into operative contact with the driven member.

Of course to vary the driving speed of one clutch relative to another on the same shaft it is only necessary to vary the diameter of the driven member from which motion is transmitted to the other shaft.

The hereinbefore-described construction is that employed in the clutch mechanism of ordinary dimensions. If, however, the diameter of the clutch be considerably increased, it is desirable that there should be a yielding contact, to a limited degree, between the shoe and the surface on the driven member with which it engages—that is to say, between the shoe on the sleeve which comes first into contact with said driven member—and to that end the construction shown in Fig. 5 is provided, which consists in forming a cylindrical boss $y$ on the sleeve at the point where the shoe is to be attached and drilling axially through said boss a hole for the reception of the bolt $z$, the lower end of which is provided with a head 2, having a slightly-larger diameter than said boss and being transversely pierced to receive the pin $k$, on which the shoe hangs. Between the said head 2 and a suitable shoulder on the sleeve $i$ there is located a stiff coiled spring 3, which is of such length that the nut 4 on the inner end of the bolt $z$ may be screwed up on said bolt to compress the spring 3, but not far enough to permit the head 2 to come to a bearing against the end of the boss $y$. With the sleeve $i$, provided with a shoe on the free side thereof, thus supported, when the sleeve is by the action of the spring $t$ swung on its support to bring said shoe into contact with the surface of the driven member said contact will be a yielding one to the extent of the power of the spring 3—that is to say, the yielding contact will be measured by the resistance of said spring to such compression as will move the head 2 against the end of the boss.

If the cone or similar controlling means for the driving member be withdrawn from the support of said driving member, the spring $t$ will move the latter laterally of the shaft, and the shoe on the moving end of said driving member will be brought into contact with the driven member. If the contact be unrestrained, as by the complete withdrawal of the cone, then as soon as the said shoe touches the driven member the spring 3 will be compressed until the shoe comes to a bearing on the driving member, whereby the other shoe will be forced into contact with the driving member, and the action of the device will be the same as when the construction shown in the other figures of the drawings is followed.

This construction in clutches of large size, wherein the circumferential speed is relatively great, permits the driving member to be brought into a light slipping contact with the driven member, which cannot be easily established where the shoe is supported on the sleeve in the manner shown in the other figures, wherein the line of resistance between the two shoes is rigid. Where the clutch is applied to the driving of automobiles, the ability to establish this light slipping contact for the purpose of greatly reducing the speed of the vehicle without losing headway is of great importance.

Having thus described my invention, what I claim, and desire to secure by Letters Patent of the United States, is—

1. In a friction-clutch, the combination with a rotatable shaft, of a driven clutch member loose on the shaft, a driving clutch member rotatable with said shaft for frictionally engaging said driven member, a radially-movable support for the driving member of the clutch on which the latter may also swing in the plane of its rotation, and means on the shaft to hold said driving member normally concentric to the shaft.

2. In a friction-clutch, a rotatable shaft, a driven clutch member loose on said shaft, a support for a driving member fixed on the shaft, a driving member to frictionally engage the driven member, a radially-movable bearing on said support for said driving member, and on which bearing the driving member may swing in the plane of its rotation relative to the shaft, together with means on the driving member for frictionally engaging the driven member, and a device on the shaft for normally holding said driving member out of frictional engagement with the driven member.

3. In a friction-clutch, a rotatable shaft, a driving clutch member loosely supported on and encircling the shaft, a pivotal support for the driving member eccentric to the shaft, on which said member may swing in the plane of its rotation, said support being radially movable relative to the shaft, a driven member loose on the shaft, means of frictional engagement between the driven and the driving member, and movable member on the shaft to engage the driving member of the clutch and hold it normally in concentric position.

4. In a friction-clutch, a rotatable shaft, a driven member, as a gear or pulley free on said shaft, having an annular flange thereon parallel with the axis of the shaft, a driving member encircling the shaft and rotatable therewith, adapted to frictionally engage said flange, and a cone slidable on the shaft into engagement with the driving member to hold the latter in concentric position relative to said flange; a bearing for the driving member eccentrically located in a suitable support fixed on the shaft, whereby when said cone is withdrawn from the driving member the latter may be moved into frictional contact with the driven member.

5. The combination with the driven member of a friction-clutch, and a rotatable shaft on which it is loosely mounted, of a support for the driving member of the clutch, fixed on the shaft; a driving member consisting of a sleeve encircling the shaft pivotally supported near the border thereof, on said fixed support, there being an annular space between said sleeve and said shaft; a cone slidable on the shaft into and out of said space, a spring between one side of said sleeve and said fixed support, and shoes on said sleeve for frictionally engaging the driven member.

6. In a friction-clutch, a rotatable shaft, a driven member free on the shaft, a driving member, a support on the shaft for the latter, said driving member having a pivotal and radially-movable engagement with said support, eccentrically located relative to the shaft, shoes on said driving member, one of which shoes has a radially-movable connection with the driving member.

7. In a friction-clutch, a rotatable shaft, a driven member loose thereon, a driving member rotatable with the shaft and eccentrically supported thereon, said driving member being movable on its support in the plane of its rotation; oppositely-disposed shoes on said driving member, one of which shoes has a radially-yielding connection with said member.

CHARLES R. GREUTER.

Witnesses:
WM. H. CHAPIN,
K. I. CLEMONS.